United States Patent Office 3,827,942
Patented Aug. 6, 1974

3,827,942
BLOOD AGAR CULTURE MEDIUM
Alice Marie Janik, Elkhart, Ind., assignor to Miles
Laboratories, Inc., Elkhart, Ind.
No Drawing. Filed Nov. 13, 1972, Ser. No. 305,976
Int. Cl. C12k 1/10
U.S. Cl. 195—100
10 Claims

ABSTRACT OF THE DISCLOSURE

A blood agar bacteriological culture medium having improved storage life is formed from a solidified aqueous mixture of agar, tryptose, polyvinylpyrrolidone, sodium chloride or sorbitol and blood the cells of which have been pretreated with a mixture of adenine and inosine. This culture medium can be placed in a petri dish to form a prepoured culture plate or it can be formed on a suitable substrate and partially dehydrated to form a rehydratable culture pad.

BACKGROUND AND PRIOR ART

Agar media containing whole blood or red blood cells (erythrocytes) are the most widely used culture media for bacteriological isolation and growth studies. Unfortunately, the prior art blood agar media had poor storage stability even under refrigeration which rendered the media unsuitable for laboratory use within a relatively short time after preparation. The blood cells in the media would undergo undesirable auto-hemolysis during storage and the overall media would also lose an excessive amount of moisture.

Daily or weekly preparation of culture media and pouring such media into petri dishes, for example, for eventual use in bacteriological studies is an undesirable chore in most laboratories. There is thus a commercial demand for culture plates containing prepoured culture media which do not have to be prepared by the laboratory personnel but are purchased ready for use. Since the prior art blood agar had such poor storage stability, prior art prepoured blood agar culture plates have had a relatively short shelf life of only about a month or less under refrigeration before they must be used or rejected as unsuitable. This is a disadvantage both for the manufacturer and the ultimate user of such prepoured culture plates.

SUMMARY OF THE INVENTION

In accordance with the present invention a blood agar bacteriological culture medium having improved storage life is provided which comprises a solidified aqueous mixture of agar, tryptose, polyvinylpyrrolidone, sodium chloride or sorbitol and blood or erythrocytes pretreated with a mixture of adenine and inosine.

DESCRIPTION OF THE INVENTION

The aqueous blood agar medium of the present invention contains from about 1 to about 3 percent agar, from about 3 to about 4 percent tryptose, from about 1 to about 10 percent polyvinylpyrrolidone, from about 0.25 to about 1 percent sorbitol or about 0.5 percent sodium chloride, and from about 2 to about 10 percent blood or erythrocytes pretreated with a mixture of adenine and inosine, such percentages being on a weight/volume basis; i.e., grams per 100 ml. of total solution, for example. Preferably, the aqueous blood agar medium contains about 1.5 percent agar, about 3 percent tryptose, about 5 percent polyvinylpyrrolidone, about 0.4 percent sorbitol, and about 3 percent erythrocytes pretreated with adenine and inosine on a weight/volume basis. When whole blood is employed, it should preferably be present in an amount from about 3 to about 10 percent. When separated erythrocytes are employed, they should preferably be present in an amount from about 2 to about 5 percent.

The blood to be used in the formation of the blood agar of the present invention should be contacted with an aqueous mixture of adenine and inosine in such concentrations that the final treated blood should contain from about 0.2 to about 2.5 milligrams of adenine and from about 6 to about 24 milligrams of inosine per gram of hemoglobin in the blood. Preferably the blood should contain about 0.28 milligrams of adenine and about 8 milligrams of inosine per gram of hemoglobin in the blood. It is preferred that packed erythrocytes obtained in the following manner be used in this invention. Whole blood, such as sheep blood, is mixed with ACD-A anticoagulant solution (0.8 weight percent citric acid, 2.2 weight percent sodium citrate, 2.45 weight percent dextrose and 0.045 weight percent adenine in distilled water). The plasma is separated from the erythrocytes by centrifugation and decanted. The sedimented-packed sheep red blood cells are then mixed with an aqueous saline solution containing 0.9 gm. sodium chloride per 100 ml. of solution and having an adenine concentration and an inosine concentration in such amounts as to achieve the above adenine and inosine levels per gram of hemoglobin in the red cells.

The adenine and inosine treatment of the erythrocytes provides improved stability against auto-hemolysis of such cells. The polyvinylpyrrolidone is believed to act as a humectant to minimize moisture loss from the medium and thus aid in stability, but its activity is not fully understood. Sorbitol is preferably included in the medium to improve storage stability and here again its activity is not fully understood.

A principal application of the present invention is in prepoured culture plates. In this application a heated liquid mixture of the novel blood agar medium is poured into a sterile petri dish, for example, in a volume suited to the particular dish size and configuration and allowed to solidify by cooling. The petri dish containing the solidified culture medium is covered and stored at room temperature or under refrigeration until it is needed as a growth medium for bacteria. This resulting prepoured culture plate can be stored for longer periods of time than prior art culture plates and still retain proper culture medium characteristics.

Another application of the present invention resides in culture medium pads. In these pads a bibulous carrier substrate capable of absorbing moisture is coated with a layer of culture medium which is subsequently dehydrated. This dehydrated medium must contain a minimum of about 40 weight percent moisture. When it is desired to employ the pad as a culture medium for bacteria growth, the pad is rehydrated and then employed in the same manner as a culture plate. Culture pads embodying the culture medium of the present invention have improved storage stability over culture pads of the prior art.

In order to prevent the bibulous carrier in a culture pad from absorbing an excessive amount of the culture medium layer, it is preferred that the bibulous carrier be coated with a moisture-permeable layer, such as ethylcellulose. The culture medium layer is then applied to the moisture-permeable layer. A layer of ethylcellulose is preferably applied to a bibulous carrier, such as filter paper, by applying a solution of from about 1 to about 10 weight percent, preferably from about 4 to about 5 weight percent, ethylcellulose dissolved in a suitable organic solvent, such as benzene or acetone, and evaporating the solvent.

The invention will be further described in the following examples.

Example 1

Tryptose, polyvinylpyrrolidone (having a molecular weight of 40,000), and sorbitol were dissolved in distilled water and the pH was adjusted to 7.2 by addition of 0.1 molar sodium hydroxide with stirring. Agar was then added to the solution which was then autoclaved at 100° C. for 20 minutes. The sterilized medium was then equilibrated in a water bath at 49° C.

A 20 ml. portion of sheep blood drawn under aseptic conditions was gently mixed with 3 ml. of sterile ACD-A anticoagulant solution. This anticoagulant solution contained 0.8 weight percent citric acid, 2.2 weight percent sodium citrate, 2.45 weight percent dextrose and 0.045 weight percent adenine in distilled water. This mixture was allowed to stand for 24 hours. The plasma was then separated from the erythrocytes by centrifugation in a sterilized test tube at low speed (2000 r.p.m. for 15–20 minutes) and then decanted. A saline aqueous adenine-inosine solution was sterilized by filtration through a membrane having ultra-fine pores. A 0.6 ml. portion of this sterilized solution (containing 0.047 g. of adenine and 1.4 g. of inosine in 100 ml. of saline solution) was added to 4 ml. of the above-prepared sedimented-packed sheep erythrocytes. The final concentration was 2 micromoles (0.28 milligrams) of adenine and 30 micromoles (8 milligrams) of inosine per gram of hemoglobin in the erythrocytes. It was estimated that the 4 ml. of erythrocytes contained 1 g. of hemoglobin.

A portion of the above adenine and inosine treated erythrocytes was then added to the above-prepared agar base at 49° C. to form an overall aqueous mixture containing 3 percent tryptose, 5 percent polyvinylpyrrolidone, 0.4 percent sorbitol, 1.5 percent agar and 3 percent erythrocytes containing 0.28 milligrams of adenine and 8 milligrams of inosine per gram of hemoglobin in the erythrocytes. All the above percent values were on a weight/volume basis. This medium was then gently mixed and poured into sterile plastic petri dishes in volumes suited to the particular dish size and configuration and allowed to solidify by cooling. The resulting culture plates were stable in excess of five months when stored under refrigeration at 5° C. and were stable for at least one month at room temperature (22–24° C.) when protected from excessive moisture loss and light. Prior art blood agar culture plates stored under the same conditions were stable for only one month under refrigeration and for only a few days at room temperature.

Example 2

Culture plates prepared as described in Example 1 were separately inoculated with strains of *Streptococcus faecalis* and *Streptococcus pyogenes* and incubated under conditions suitable for growth of these organisms. There was growth of each organism as well as appropriate alpha and beta hemolysis of the blood agar appropriate for the particular species. This demonstrates utility for the present invention.

Example 3

Culture plates prepared as described in Example 1 were separately inoculated with strains of *Enterobacter aerogenes, Klebsiella pneumoniae, Escherichia coli, Staphylococcus aureus, Shigella flexneri, Citrobacter freundi, Providencia stuartii, Bacterium anitratum, Flavobacterium, Pseudomonas aeroginosa, Proteus mirabilis, Proteus vulgaris, Serratia marcescens, Staphylococcus epidermis* and *Salmonella typhimurium* and incubated under conditions suitable for growth of these organisms. There was adequate growth of each organism. This indicates the broad utility of this stabilized blood agar for growth of a wide variety of organisms.

Example 4

Culture plates were prepared from a blood agar prepared as in Example 1 except that 0.5 percent (weight/volume basis) sodium chloride was employed in the agar medium instead of the sorbitol. The resulting plates were stable and were suitable for organism growth.

Example 5

Blood agar culture pads were prepared by coating filter paper on one side with a solution of 5 weight percent ethylcellulose in benzene and evaporating the solvent and then applying to the ethylcellulose layer a layer of blood agar medium prepared as in Example 1. The blood agar medium was then dehydrated to about 40 weight percent moisture by drying at 42° C. for 15 minutes in a forced air oven. The resulting pads were stable up to at least eight weeks at 4° C. and could be rehydrated and used as nutrient substrate for growth of organisms. Prior art culture pads which did not employ the stabilized blood agar medium of the present invention were stable for only a shorter period of time.

Example 6

Culture plates were prepared employing a blood agar medium as in Example 1 except that the medium contained from 3 to 10 percent (weight/volume basis) whole blood which had been treated with adenine and inosine. The resulting plates were stable and were suitable for organism growth.

What is claimed is:

1. A blood agar bacteriological culture medium having improved storage life comprising a solidified aqueous mixture containing from about 1 to about 3 percent agar, from about 3 to about 4 percent tryptose, from about 1 to about 10 percent polyvinylpyrrolidone, from about 0.25 to about 1 percent sorbitol or about 0.5 percent sodium chloride, and from about 2 to about 10 percent blood or erythrocytes pretreated with a mixture of adenine and inosine, such percentages being on a weight/volume basis.

2. A blood agar medium according to Claim 1 wherein the blood or erythrocytes contain from about 0.2 to about 2.5 milligrams of adenine and from about 6 to about 24 milligrams of inosine per gram of hemoglobin in the blood or erythrocytes.

3. A blood agar medium according to Claim 1 comprising a solidified aqueous mixture of about 1.5 percent agar, about 3 percent tryptose, about 5 percent polyvinylpyrrolidone, about 0.4 percent sorbitol, and about 3 percent erythrocytes containing about 0.28 milligrams of adenine and about 8 milligrams of inosine per gram of hemoglobin in the erythrocytes.

4. A prepoured blood agar culture plate having improved storage life comprising a petri dish containing the culture medium of Claim 3.

5. A rehydratable bacteriological culture pad having improved storage life comprising a substrate covered with a blood agar medium of Claim 3 dehydrated on said substrate so as to contain a minimum of about 40 weight percent moisture.

6. A prepoured blood agar culture plate having improved storage life comprising a petri dish containing the culture medium of Claim 1.

7. A rehydratable bacteriological culture pad having improved storage life comprising a substrate covered with a blood agar medium of Claim 1 dehydrated on said substrate so as to contain a minimum of about 40 weight percent moisture.

8. A culture pad according to Claim 7 wherein the substrate consists of a bibulous carrier coated with a layer of ethylcellulose.

9. A culture pad according to Claim 8 wherein the layer of ethylcellulose was prepared by applying a solution of from about 1 to about 10 weight percent ethylcellulose in a suitable organic solvent and evaporating the solvent.

10. A culture pad according to Claim 9 wherein the solution contains from about 4 to about 5 weight percent ethylcellulose.

References Cited

Compilation of Culture Media, Max Levine and H. W. Schoenlein, page 272; 1930.

A. LOUIS MONACELL, Primary Examiner

R. J. WARDEN, Assistant Examiner

U.S. Cl. X.R.

195—99, 101, 102, 103